(12) United States Patent
Orlando et al.

(10) Patent No.: US 7,251,673 B2
(45) Date of Patent: Jul. 31, 2007

(54) METHOD FOR PERFORMING INTEGER DIVISIONS

(75) Inventors: William Orlando, Peynier (FR); Sophie Gabriele, Fuveau (FR)

(73) Assignee: STMicroelectronics S.A., Montrouge (FR)

( * ) Notice: Subject to any disclaimer, the term of this patent is extended or adjusted under 35 U.S.C. 154(b) by 650 days.

(21) Appl. No.: 10/400,811

(22) Filed: Mar. 27, 2003

(65) Prior Publication Data

US 2003/0187901 A1 Oct. 2, 2003

(30) Foreign Application Priority Data

Mar. 27, 2002 (FR) .................................. 02 03846

(51) Int. Cl.
*G06F 7/52* (2006.01)
(52) U.S. Cl. ..................................................... 708/650
(58) Field of Classification Search ................ 708/650, 708/653

See application file for complete search history.

(56) References Cited

U.S. PATENT DOCUMENTS

| 4,989,173 | A | 1/1991 | Kaneda |
| 7,007,058 | B1* | 2/2006 | Kotlov ........................ 708/654 |
| 2002/0129076 | A1* | 9/2002 | Clausen et al. ............. 708/650 |
| 2002/0169814 | A1* | 11/2002 | Tanaka ........................ 708/650 |

OTHER PUBLICATIONS

French Search Report from French Patent Application 02/03846, filed Mar. 27, 2002.

\* cited by examiner

*Primary Examiner*—Chuong D. Ngo
(74) *Attorney, Agent, or Firm*—Lisa K. Jorgenson; James H. Morris; Wolf, Greenfield & Sacks, P.C.

(57) ABSTRACT

A method of automatic calculation of several integer divisions by a same integer divider, of several successive integer dividends, separated from one another by a constant iteration step, smaller than or equal to the divider, including selecting, from a table of increments, according to an iteration index, a 0 or a 1 to be added to the operation result of the preceding iteration, the number of 0s in the table of increments being equal to the divider minus 1.

13 Claims, 1 Drawing Sheet

METHOD FOR PERFORMING INTEGER DIVISIONS

BACKGROUND OF THE INVENTION

1. Field of the Invention

The present invention relates to the field of calculations on numbers performed by computer means. The present invention more specifically relates to the performing of an operation of integer division type.

2. Discussion of the Related Art

An example of application of the present invention is the processing of digital images and, more specifically, calculations performed on image blocks in fractal coding. In such an application, the image is divided into overlapping blocks and different calculations are applied to the values (levels of grey or color levels) of the different digitally-coded pixels. A specific operation which is frequently performed in digital image processing and which requires significant calculation resources is division. Such a division is used, for example, to perform mean value or variance calculations on pixel blocks.

The present invention more specifically applies to the performing of division in iterative operations, that is, division for which at least part of the result of a preceding division is used again for the current division. Such is the case, for the example of application to image processing, for which the fact of having overlapping blocks leads to operations involving operation results concerning a preceding block.

SUMMARY OF THE INVENTION

The present invention aims at providing an automatic integer division calculation method which enables accelerating calculations.

The present invention also aims at providing a method which requires little computer resources and which, more specifically, spares cycle time.

The present invention also aims at providing a method which can apply whatever the integer dividend and divider, provided that the searched and exploited result is an integer.

The present invention further aims at providing an integrated processor capable of implementing such a method.

To achieve these and other objects, the present invention provides a method of automatic calculation of several integer divisions by a same integer divider, of several successive integer dividends, separated from one another by a constant iteration step, smaller than or equal to the divider, comprising selecting, from a table of increments, according to an iteration index, a 0 or a 1 to be added to the operation result of the preceding iteration, the number of 0s in the table of increments being equal to the divider minus 1.

According to an embodiment of the present invention, the number of 1s in the table of increments is equal to the iteration step.

According to an embodiment of the present invention, the iteration step is 1, the iteration index being reset to 1 modulo the divider.

According to an embodiment of the present invention, the method comprises selecting the iteration index from a table of indexes containing a succession of integers, the size of the index table being equal to the increment size.

According to an embodiment of the present invention, the method comprises the steps of:

creating a table of increments containing div−1 zero values and a number of unit values corresponding to the iteration step, where div represents the divider;

setting an index;

setting a result;

setting a dividend; and executing in a loop the selection of one of the div values contained in the table of increments to add it to the result of the preceding iteration.

According to an embodiment of the present invention, the method further comprises the steps of:

creating a table of indexes containing div values forming a sequence of integers from 1 to div−1+step, where step represents the iteration step, the last value in the table being the unit; and selecting the selection index of the value taken from the table of increments based on the index table.

The present invention also provides an integrated calculation processor.

The foregoing objects, features and advantages of the present invention, will be discussed in detail in the following non-limiting description of specific embodiments in connection with the accompanying drawings.

DETAILED DESCRIPTION

Figure 1:
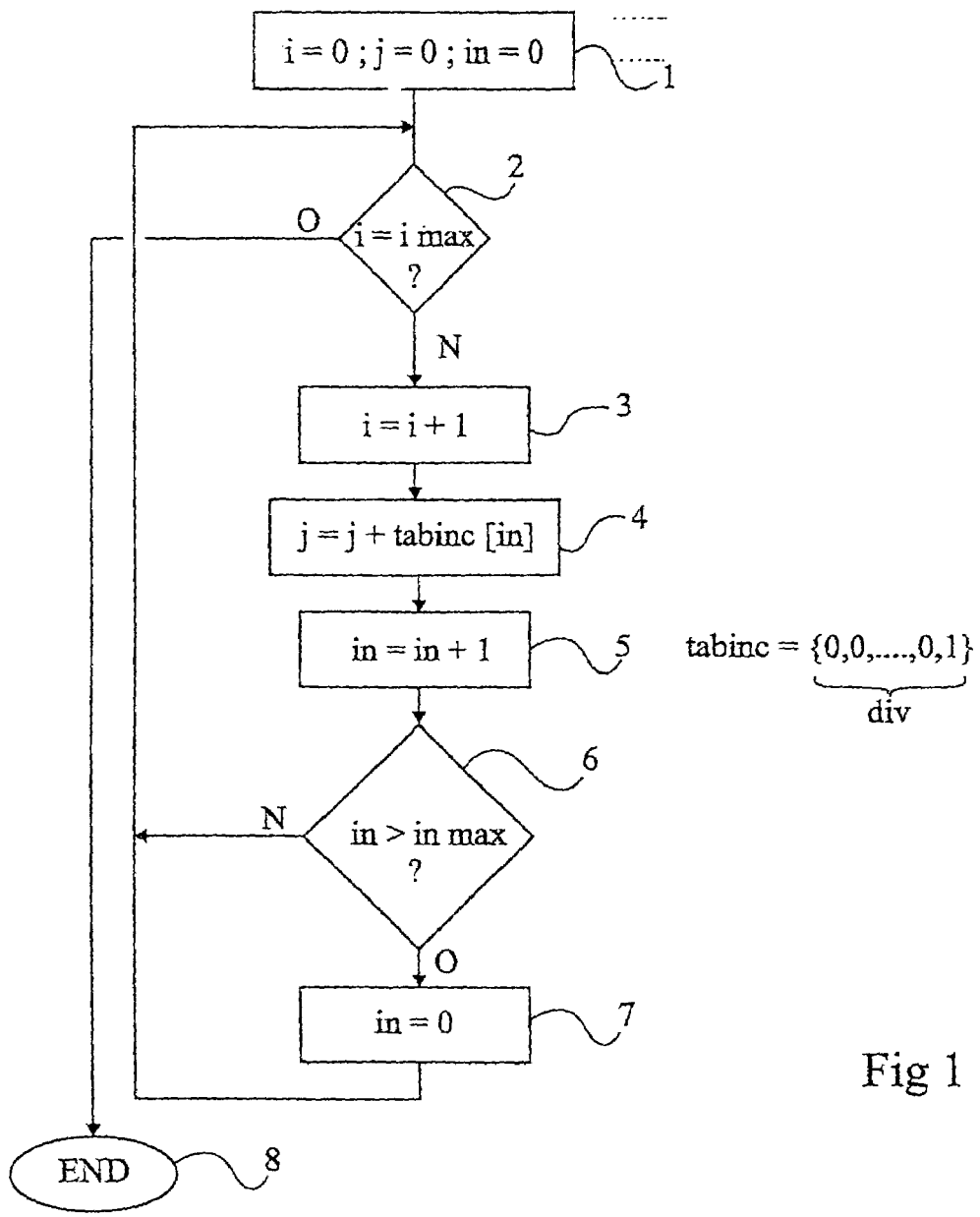
FIG. 1 shows in the form of a flowchart a first embodiment of the present invention.

For clarity, only those steps of the method that are necessary to the understanding of the present invention have been shown in the drawings and will be described hereafter. In particular, the implementation of basic operations by means of a computer system is conventional and will not be discussed in detail. It should be noted that the present invention applies whatever the type of computer tool used, the programming of such a tool to implement the present invention being within the abilities of those skilled in the art based on the indications given in the following description.

The present invention takes advantage of specificities of the integer divisions to which it applies. The present invention especially takes advantage of the fact that the divisions to which it applies are divisions involving a loop index number, that is, which involve an incremental calculation in which two successive divisions are separated from each other by a constant iteration step. This iteration step is smaller than or equal to the integer divider.

A feature of the present invention is to use a table of increments containing quantities to be added to the result of the preceding division to obtain the current result of the integer division.

Another feature of the present invention is that the size (number of values) of this table corresponds to the divider.

FIG. 1 shows a flowchart of an embodiment of the automatic calculation method according to the present invention.

It is assumed that the division to be performed has i as a dividend, div as a divider, and j as successive results. In other words, j represents the result of the integer division performed by the present invention at each calculation step. Quantities i, j, and div are integers.

An increment table tabinc specific to the present invention is first stored. This table of increments contains, for example, div elements, that is, a number of elements equal to the integer divider of the operations to be performed. According to the present invention, all the values in the table of increments are 0, except for the last one, which is 1.

Then, in a first actual division step (block 1: i=0, j=0, in=1), the different counters and variables used in the implementation of the method of the present invention are set. For example, dividend i is set to 0, result j is set to 0 and an index variable in is set to 1. Variable in is used to select one of the elements in the table of increments according to the current operation.

Next step 2 comprises a test (i=$i_{max}$?) to check that the current divider i does not exceed the maximum dividend to be applied. In the example of application of the present invention to image processing, the maximum dividend corresponds, for example, to the number of pixels in an image line.

Then, the dividend is incremented by one unit (block 3, i=i+1) or, more generally, by the number corresponding to the iteration step of the divisions to be performed.

After this, a step characteristic of the present invention comprises selecting, from the previously-created table of increments, the number corresponding to the current index in (block 4, j=j+tabinc[in]). At the first go or loop, the selected number is 0. At the next loops, this number is still 0 until an index equal to the divider minus 1 is reached, where the number contained in the table of increments is 1. Accordingly, the result of step 4 provides a 0 at the first go or loop as well as at all the following loops, as long as the number of loops has not reached the number equal to divider div. Then, step 4 increments result j by 1.

The step (block 5, in=in+1) following step 4 in the current loop comprises incrementing the index to prepare for the next loop. The increment corresponds to the iteration step, that is, to the interval between two successive dividends. In the example of FIG. 1 where the iteration step is equal to one, a test 6 (in>$in_{max}$?) is then performed to reset (step 7, in=1) the index when it has reached the maximum number. Number $in_{max}$ corresponds to divider div in the embodiment of FIG. 1. More generally, steps 5, 6 and 7 correspond to an increment of index in modulo the divider.

If the index does not correspond to the maximum value, the program returns to step 2 to test the value of dividend i with respect to the maximum dividend and to increment it (step 3) to perform the next operation. If the index is greater than the maximum index (test 6), it is reset before returning, there again, to step 2 to test the dividend with respect to the maximum dividend.

It can be seen that only when in=div−1 is the increment selected from the table of increments unit 1. This amounts to incrementing result j by one unit.

Considering the example of a division by 3, the table of increments is {0, 0, 1}.

The successive results of the integer division are, considering a sequence of dividends starting from 1 with a unit iteration step, 0 (1/3), 0 (2/3), 1 (3/3), 1 (4/3), 1 (5/3), 2 (6/3), etc.

Considering an iteration step of 2, the successive results are 0 (1/3), 1 (3/3), 1 (5/3), 2 (7/3), etc.

Considering an iteration step of 3, the successive results are 0 (1/3), 1 (4/3), 2 (7/3), etc.

An advantage of the use of a table of increments is that this considerably simplifies the calculations to be performed. In particular, no actual division is required. Currently, such divisions are instruction sequences particularly greedy in terms of cycle time in the processing by a calculation processor.

It should be noted that the setting to 1 of variable in at steps 1 and 7 could be replaced with a setting to 0 or to any value (smaller than div). The length of increment table tabinc is a function of the setting value. In the case of a setting to 0, the length of table tabinc is div+1. Further, the setting value of course depends on the position, in the loop, of increment step 5 with respect to calculation step 4.

Figure 2:
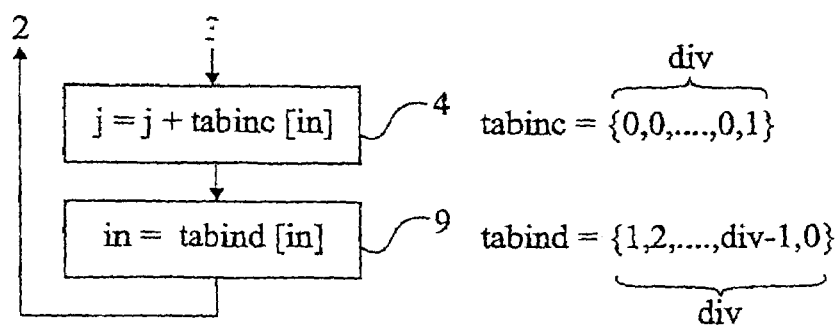
FIG. 2 is a partial flowchart of an alternative of the present invention.

FIG. 2 illustrates, in a partial flowchart, an alternative of FIG. 1 enabling further reduction of the loop time of the method of the present invention. For this purpose, it is desired to eliminate test 6 on the increment value by replacing it with an index table tabind from which the indexes to be used in step 4 will successively be selected. In FIG. 2, only step 4 and step 9 (in=tabind[in]) replacing steps 5, 6, and 7 of FIG. 1 have been shown, steps 1, 2, 3, and 8 being identical and steps 5, 6, and 7 being eliminated.

According to this embodiment, an index table having, for an iteration step of 1, a size corresponding to divider div, is generated. This index table successively contains, in this case, integers 1, 2, . . . , div−1, followed by value 0. Accordingly, by selecting an index, at step 9 which follows step 4 of operation, the indexes to be used are successively obtained. The index resetting is performed by the last element in the index table.

In the example of the division by 3, with a step of 1, the index table is {1, 2, 0}.

Like for increment table tabinc, the length of the index table depends on the setting value of variable in. If setting value is 0 rather than 1, the length of table tabind is div+1.

An advantage of the embodiment illustrated in FIG. 2 is that it further reduces the loop time necessary to calculate the integer division. Accordingly, the operation processing to perform the division is further accelerated.

An advantage of the present invention is that it enables performing an integer division in a particularly fast manner in software form, without requiring use of dedicated wired-logic processors.

Another advantage of the present invention is it is particularly simple to implement and only requires, by software means, simple operations.

The present invention is particularly advantageous in the case where the calculations are implemented in an integrated circuit containing the calculation processor and the memory (for example, of ROM type) containing the program to be executed. In such a case, the calculation and storage capacity saving is particularly advantageous. In the example of application of the present invention to digital image processing, the present invention finds a specific advantage in that by accelerating the time necessary to execute the divisions, it considerably accelerates the image processing in software form. In particular, the present invention enables real time processing of images in the context of a video display.

Of course, the present invention is likely to have various alterations, modifications, and improvement which will readily occur to those skilled in the art. In particular, although the present invention has been illustrated in relation with a unit iteration step, it should be noted that the present invention applies whatever the chosen iteration step, provided that it is smaller than or equal to the divider. A first preferred solution is to extend the length of table tabinc (and tabind if present). Its length then corresponds to div−1+step (or div+step in the case of a setting to 0), where step represents the selected iteration step (smaller than div−1). For the table of increments, the last "step" values are then at 1. A second solution is to provide an additional testing to determine when to return to the beginning of the table of increments. The same line of reasoning applies for the index table. Adapting the present invention to such an alternative is within the abilities of those skilled in the art based on the functional indications given hereabove.

Further, the practical implementation of the present invention by programming of a computer system is also within the abilities of those skilled in the art by adapting the flowcharts indicated in FIGS. 1 and 2 to the programming language used.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of processing a digital image that includes multiple pixels of information, the method comprising:
    identifying a common integer divider corresponding to a number of pixels in a portion of a digital image;
    identifying a constant iteration step that is smaller or equal to the common integer divder;
    selecting, from an increment table according to an iteration index, a value of either 1 or 0 to be added to an operating result of a preceding iteration, the number of 0s in the increment table being equal to the common integer divider minus 1; and
    producing a final operating result that represents the portion of the digital image.

2. The method of claim 1, wherein the number of 1s in the increment table is equal to the iteration step.

3. The method of claim 1, wherein the iteration step is 1, the iteration index being reset to 1 modulo the common integer divider.

4. The method of claim 1, further comprising:
    selecting the iteration index from an index table containing a succession of integers, a size of the index table being equal to the increment size.

5. The method of claim 1, wherein the increment table contains a number of positions that corresponds to a value of the common integer divider, a final position of the increment table including a value of 1, and remaining positions of the increment table including values of 0, the method further comprising:
    setting an index;
    setting a result;
    setting a dividend; and
    executing, in a loop, addition of values from the increment table at positions corresponding to the iteration step, to the operating result.

6. The method of claim 5, further comprising the steps of:
    creating an index table containing a number of positions that correspond to the value of the common integer divider and that forms a sequence of integers from 1 to the common integer divider minus 1, with the final position of the table index being 0; and
    selecting the values from the increment table based on the values of the index table for the current iteration.

7. The method of claim 1 integrated into a calculation processor.

8. A method of processing a digital image that includes multiple pixels of information, the method comprising:
    defining a denominator that corresponds to a number of pixels in a portion of a digital image, the denominator being an integer;
    defining an increment variable that is less than or equal to the denominator;
    defining a result variable and initializing the result variable;
    defining a counter variable and initializing the counter variable;
    defining a counter maximum corresponding to a value to be divided;
    defining an increment table having a number of positions that corresponds to the number of pixels in the portion of the digital image, a final position of the increment table including a value of 1, and remaining positions of the increment table including values of 0; and
    entering a calculation loop that comprises the acts of:
        comparing the counter variable to the counter maximum and producing the result variable as representing a characteristic of the portion of the digital image when the counter variable is equal to the counter maximum;
        adding 1 to the counter variable;
        adding a value from the increment table to the result variable, the value from the increment table taken from a position that corresponds to the increment variable;
        adding 1 to the increment variable;
        comparing the counter variable to the denominator and resetting the counter variable when the counter variable is greater than the denominator;
        resetting the increment variable when the increment variable is greater than the denominator; and
        repeating the calculation loop.

9. The method of claim 8, wherein the result variable represents a mean value of pixels in the portion of the digital image.

10. The method of claim 8, wherein the result variable represents a variance value of pixels in the portion of the digital image.

11. A method of processing a digital image that includes multiple pixels of information, the method comprising:
    defining a denominator that corresponds to a number of pixels in a portion of a digital image, the denominator being an integer;
    defining an increment variable that is less than the denominator;
    defining a result variable and initializing the result variable;
    defining a counter variable and initializing the counter variable;
    defining a counter maximum corresponding to a value to be divided;
    defining an increment table having a number of positions that corresponds to the number of pixels in the portion of the digital image, a final position of the increment table including a value of 1, and remaining positions of the increment table including values of 0;
    defining an increment table having a number of positions that corresponds to the denominator; and
    entering a calculation loop that comprises the acts of:
        comparing the counter variable to the counter maximum and producing the result variable as representing a characteristic of the portion of the digital image when the counter variable is equal to the counter maximum;
        adding 1 to the counter variable;

adding a value from the increment table to the result variable, the value from the increment table taken from a position that corresponds to the increment variable;

resetting the increment variable to reflect a value from an index table at a position that corresponds to the counter variable; and repeating the calculation loop.

12. The method of claim 11, wherein the result variable represents a mean value of pixels in the portion of the digital image.

13. The method of claim 11, wherein the result variable represents a variance value of pixels in the portion of the digital image.

* * * * *

UNITED STATES PATENT AND TRADEMARK OFFICE
CERTIFICATE OF CORRECTION

PATENT NO. : 7,251,673 B2 Page 1 of 1
APPLICATION NO. : 10/400811
DATED : July 31, 2007
INVENTOR(S) : William Orlando et al.

It is certified that error appears in the above-identified patent and that said Letters Patent is hereby corrected as shown below:

Claim 1, col. 5, line 23 should read:
equal to the common integer divider;

Signed and Sealed this

Ninth Day of October, 2007

JON W. DUDAS
*Director of the United States Patent and Trademark Office*